(12) United States Patent
Shah et al.

(10) Patent No.: US 12,621,662 B2
(45) Date of Patent: May 5, 2026

(54) METHODS, DEVICES AND SYSTEMS FOR REPEATING SECURE WIRELESS CONNECTIONS

(71) Applicant: Cypress Semiconductor Corporation, San Jose, CA (US)

(72) Inventors: Vikas Dineshkumar Shah, Vijayanagar (IN); Rakesh Eluvan Periyaeluvan, Bangalore (IN); Deepak Poongundrun, Virudhunagar (IN)

(73) Assignee: Cypress Semiconductor Corporation, San Jose, CA (US)

( * ) Notice: Subject to any disclaimer, the term of this patent is extended or adjusted under 35 U.S.C. 154(b) by 44 days.

(21) Appl. No.: 18/441,218

(22) Filed: Feb. 14, 2024

(65) Prior Publication Data

US 2025/0260975 A1     Aug. 14, 2025

(51) Int. Cl.
| | |
|---|---|
| *H04L 29/06* | (2006.01) |
| *H04W 12/033* | (2021.01) |
| *H04W 12/0431* | (2021.01) |
| *H04W 12/0433* | (2021.01) |
| *H04W 12/069* | (2021.01) |

(52) U.S. Cl.
CPC ..... *H04W 12/0431* (2021.01); *H04W 12/033* (2021.01); *H04W 12/0433* (2021.01); *H04W 12/069* (2021.01)

(58) Field of Classification Search
CPC ......... H04W 12/0431; H04W 12/0433; H04W 12/069; H04W 12/033
See application file for complete search history.

(56) References Cited

U.S. PATENT DOCUMENTS

| | | | |
|---|---|---|---|
| 11,240,007 B1 * | 2/2022 | Higgins | ................ H04L 9/3268 |
| 2006/0177068 A1 * | 8/2006 | Hatakeyama | ........... G06F 21/51 |
| | | | 380/282 |
| 2023/0333767 A1 * | 10/2023 | Macgaffey | ............ H04L 67/568 |

* cited by examiner

*Primary Examiner* — Evans Desrosiers

(57) ABSTRACT

A method can include, by operation of a first wireless device, executing a hash operation on a first portion of a received authentication value to generate a hash result. In response to determining that a connection is to be refreshed, an authentication validate can be validated by decrypting a second portion of the authentication value to generate a decryption result and comparing the hash result to the decryption result. The decryption result can be stored. In response to determining that a connection is not to be refreshed, an authentication value can be validated by comparing the hash result to a previously stored decryption result. Corresponding devices and systems are also disclosed.

18 Claims, 13 Drawing Sheets

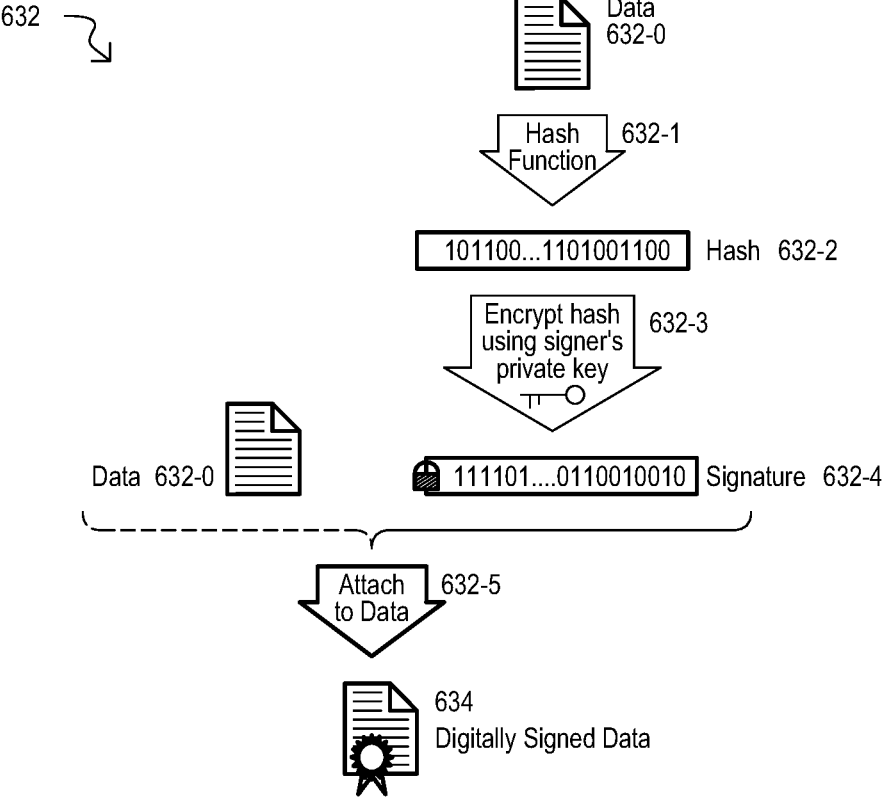
FIG. 6 (BACKGROUND)

850

METHODS, DEVICES AND SYSTEMS FOR REPEATING SECURE WIRELESS CONNECTIONS

TECHNICAL FIELD

The present disclosure relates generally to wireless systems, and more particular to wireless systems that can establish a secure connection by validating received authentication data, such as digital certificates.

BACKGROUND

The addition of network connectivity to consumer and industrial devices has resulted in the growing Internet of Things (IoT). To ensure the security of network connections, devices typically execute a protocol for establishing an encryption scheme between to endpoints. Such security protocols can include Secure Sockets Layer (SSL), Transport Layer Security (TLS) and various related protocols (e.g., QUIC).

Many conventional security protocols rely on a certificate authority (CA) for authenticating endpoints, such as servers corresponding to queries to an Internet domain name. A CA can issue and/or sign digital certificates which can be transmitted to authenticate a sending endpoint. Such authentication operations typically involve the use of an agreed upon cryptographic hash function and a decryption operation using a Public Key Infrastructure (PKI) key.

SUMMARY

Embodiments can include methods, devices and systems that can execute a hash operation on a first portion of a received authentication value to generate a hash result. In response to determining that a connection is to be refreshed, the authentication value can be validated by decrypting a second portion of the authentication value to generate a decryption result and comparing the hash result to the decryption result. In response to determining that the connection is not to be refreshed (e.g., a connection is to a previously accessed server), the authentication value can be validated by comparing the hash result to a decryption result that was previously generated and stored.

BRIEF DESCRIPTION OF THE DRAWINGS

FIG. 6 is a diagram showing an example of the generation of digitally signed data.

DETAILED DESCRIPTION

According to embodiments, a wireless device can provide rapid, and low power authentication for a previously accessed endpoint. When establishing a connection, a wireless device can receive an authentication value (e.g., digital certificate) from a destination endpoint, and execute various operations, including a decryption operation, to validate the authentication value. If the authentication value is valid, results of a decryption operation can be stored. In a later authentication operation (e.g., a subsequent connection to the same endpoint), rather than execute a decryption operation on a received authentication value, the stored decryption result can be used to validate the authentication value. By providing an authentication operation that does not include decryption, the authentication operation can faster and/or consume less power.

In some embodiments, an authentication value can be a digital certificate that is parsed into first and second portions. In a one authentication operation, a hash operation can be executed on the first portion, while the second portion is subject to a decryption operation. The hashed result can be compared to the decrypted result. In another authentication operation, a hash operation can be executed on the first portion, which can be compared to a previously stored hash result without having to decrypt a second portion.

In some embodiments, a received authentication value can be a server digital certificate issued by a Certificate Authority (CA). A wireless device can store a device digital certificate that can include a decryption key.

In some embodiments, authentication operations can be part of a Transport Layer Security (TLS) handshake.

In some embodiments, a decryption result can be stored in a secure memory of a wireless device for use in later authentication operations.

In some embodiments, an authentication operation that relies on a previous decryption result can be executed by an IoT device, allowing for rapid reconnection to a corresponding server and/or reduced power consumption for repeated connections.

Figure 1:
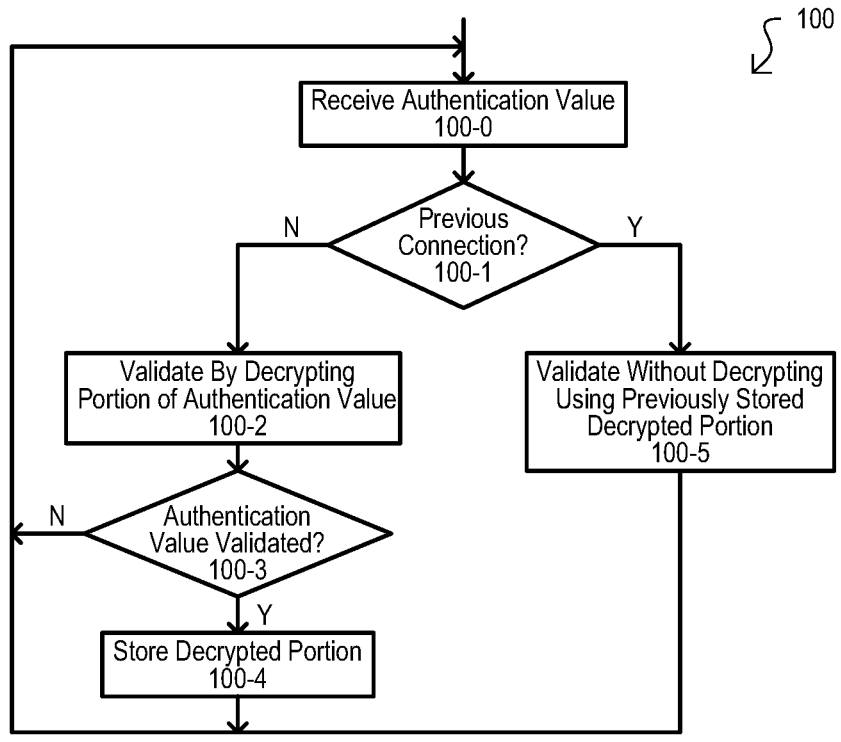
FIG. 1 is a flow diagram of a method for validating authentication values of wireless connections according to an embodiment.

FIG. 1 is a flow diagram of a method 100 according to an embodiment. In some embodiments, a method can be executed by a wireless device that establishes a secure connection with an endpoint. A method 100 can include receiving an authentication value 100-0. Such an operation can include receiving an authentication value from another device, or endpoint. An authentication value can be received in response to a previous message, including as part of a protocol or some other agreed upon sequence.

A method 100 can determine if an authentication value corresponds to a previous connection 100-1. Such an action can include examining data at any suitable point in a connection process. Such a value may be known prior to establishing a connection (e.g., comparing a current destination address to a previous destination address) or during a connection (e.g., comparing data in a received authentication value to previously received authentication data).

If there was not a previous connection (N from 100-1), a method can validate the authentication value by decrypting a portion of the authentication value 100-2. In some embodiments, in addition to decryption, validation can include any other suitable operations, including but not limited to data parsing and hash functions. If the authentication value is not validated (N from 100-3), a method can end (e.g., authentication of the connection has failed). If the authentication value is validated (Y from 100-3), a method can store the decrypted portion of the authentication value 100-4. Such an action can include any suitable storage operations, including but not limited to, storing such a value in nonvolatile or volatile memory, including in a secure portion of memory circuits.

If there was a previous connection (Y from 100-1), a method can validate the authentication value without decryption, by using a previously stored decrypted portion 100-5. In some embodiments, such an action can include any other suitable operations, including but not limited to data parsing and hash functions. However, by avoiding decryption, authentication can be faster and/or consume less power as decryption operations can require more computation resources.

In this way, a method can recall a previous decryption result for use in authentication operation to avoid repeating decryption operations when connecting to a same endpoint.

Figure 2:
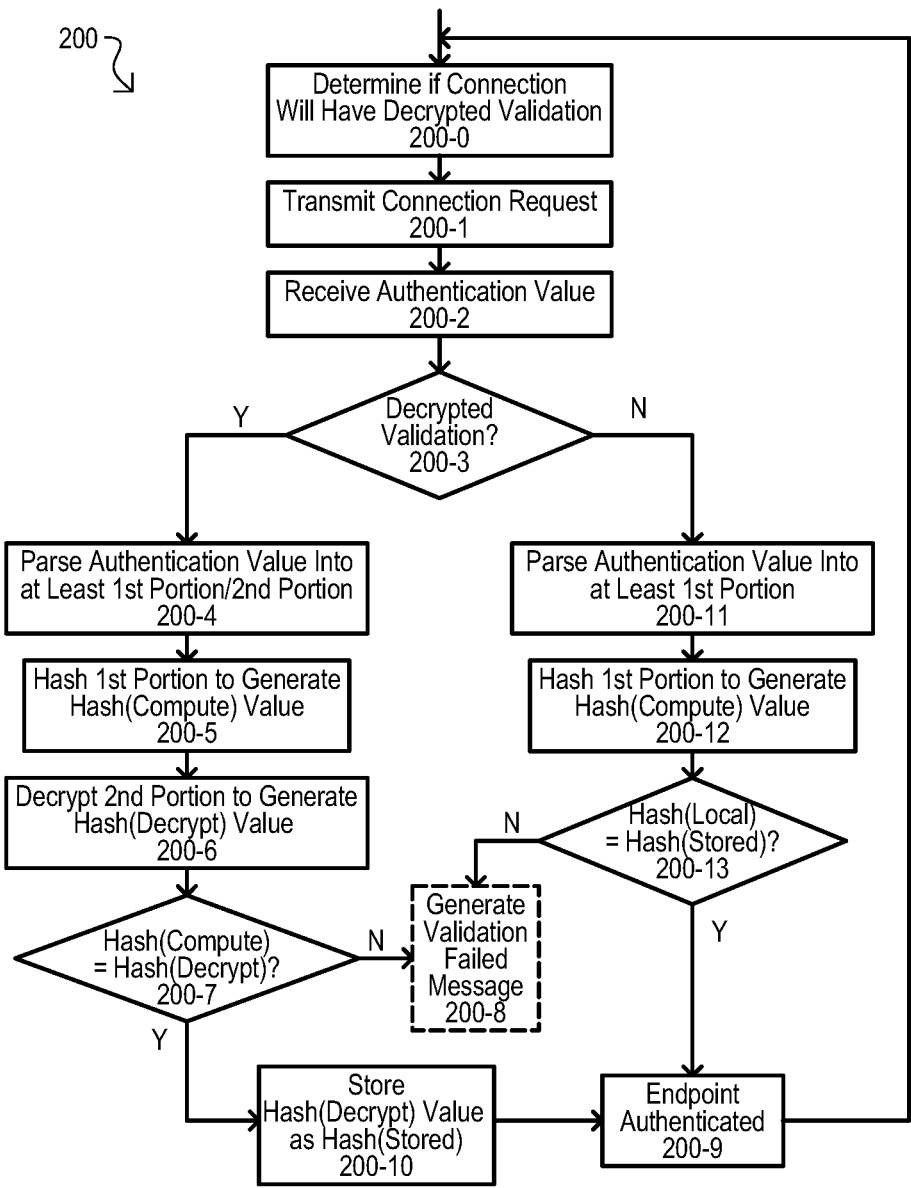
FIG. 2 is a flow diagram of a method for validating authentication values with hash and decryption operations according to an embodiment.

FIG. 2 is a flow diagram of a method 200 according to another embodiment. In some embodiments, a method 200 can be executed by a wireless device having computing resources for executing hash and decryption operations. A method 200 can include determining if a connection will have decrypted validation 200-0. Such an action can include but is not limited to, determining if a connection was previously made to a destination endpoint, determining if such a previous connection was previously made within a certain time period, determining if a received authentication value (e.g., digital certificate) corresponds to a previously received authentication value, determining if such an authentication value was received within a certain time period, and determining if a received authentication value is not expired (e.g., the current time/date is beyond its validity period).

A method 200 can include transmitting a connection request 200-1. Such an action can take any suitable form depending upon the communication protocol/standard being used. In some embodiments, such a connection request can indicate a type of protocol/standard to be used. An authentication value can be received 200-2. Such an action can include an authentication value being included as part of one or more data frames. In some embodiments, transmitting a connection request and receiving an authentication value (200-1/2) can be part of a handshake operation.

If a connection will have decrypted validation (Y from 200-3), a method 200 can parse an authentication value into at least a first portion and a second portion 200-4. Such an action can include but is not limited to determining portions of an authentication value according to a protocol/standard. A hash function can be executed on a first portion of an authentication value to generate a Hash(Compute) value 200-5. In some embodiments, such an action can include using a hash function indicated by an agreed upon protocol/ standard. A decryption operation can be executed on a second portion to generate a Hash(Decrypt) value 200-6. Such an action can include accessing a stored decryption key, and then executing a decryption operation according to an agreed upon protocol/standard. A value generated by hashing a first portion (Hash(Compute)) can be compared to that generated by decrypting a second portion (Hash(Decrypt)) 200-7. If such values do not match (N from 200-7), validation can be determined to have failed. Optionally, a message can be generated and transmitted, indicating an authentication failure 200-8.

If Hash(Compute) matches Hash(Decrypt) (Y from 200-7), the value generated by decrypting (Hash(Decrypt)) can be stored 200-10 (as Hash(Stored)). In some embodiments such an action can include storing such a value in memory circuits. Such memory circuits can be volatile or nonvolatile. n authentication value can be determined to be validated 200-9. If Hash(Compute) matches Hash(Decrypt) (Y from 200-7), an authentication operation can be successful, and a destination endpoint can be authenticated 200-9.

If a connection will not have decrypted validation (N from 200-3), a method 200 can parse an authentication value into at least a first portion 200-11. A hash function can be executed on a first portion of an authentication value to generate a Hash(Compute) value 200-12. Such actions can include any of those described for 200-4 and 200-5 or equivalents. A value generated by hashing a first portion (Hash(Compute)) can be compared to a previously stored value (Hash(Stored)) generated by decrypting a second portion of an authentication value 200-13. If such values do not match (N from 200-13), validation can be determined to have failed 200-8. If such values do match (Y from 200-13), an authentication value can be determined to be validated 200-9.

In this way, a method can include authentication operations that can parse an authentication value into two portions. In one authentication operation, one portion can be hashed and the other decrypted, and the resulting values compared to one another. In another authentication operation, one portion can be hashed and compared to a stored value, previously generated by decrypting a portion of a previous authentication value.

Figure 3:
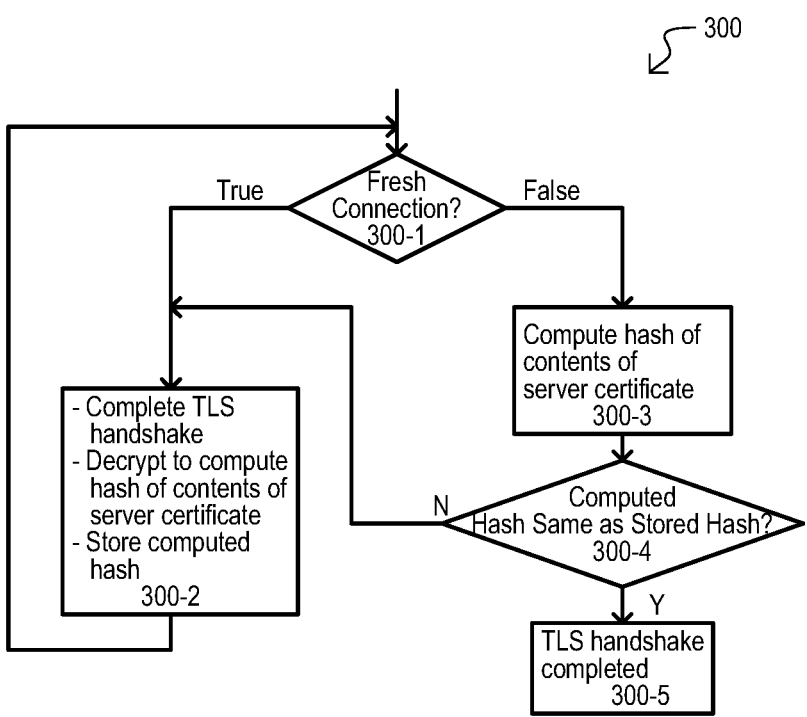
FIG. 3 is a flow diagram of a method for executing Transport Layer Security (TLS) handshakes according to an embodiment.

While embodiments can operate according to any suitable method or protocol, some embodiments can be included in a TLS handshake to enable a wireless device to rapidly establish secure connections to a frequently accessed endpoint. As but one of many possible embodiments, a wireless device can be an Internet of Things (IoT) type device that frequently reconnects to a reporting server. FIG. 3 is a flow diagram showing such a method.

FIG. 3 is a flow diagram of a method 300 according to an embodiment. A method 300 can be executed by a client wireless device that performs a TLS handshake with a host (e.g., server system) that can authenticate itself with a digital certificate. A method 300 can include determining if a connection should be a fresh connection 300-1. Such a determination can be made based on any suitable criteria as described herein, or equivalents, including but not limited to, connection type (prior connection, prior connection within time limit, a state of a device (e.g., firmware update, change of network, reset or power cycle). In addition or alternatively, such a determination can be made based on a received server certificate (i.e., digital certificate provided by a server).

If a fresh connection is indicated (True from 300-1), a method can complete a TLS handshake. However, in contrast to conventional TLS operations, in addition, a hash of server certificate contents generated by decryption can be stored as a computed hash 300-2.

If a fresh connection is not indicated (False from 300-1), a method can compute a hash of the contents of a server certificate 300-3. In some embodiments, such an action can include computing the hash of an unencrypted portion of a server certificate. If such a computed hash is the same as a stored hash (i.e., hash stored in 300-2) (Y from 300-4), a TLS handshake can be completed 300-5. In some embodiments, such an action can also include performing those conventional TLS steps that follow validation of a host digital certificate (e.g., key seed exchange, change to master key encryption).

In the embodiment shown, if a computed hash does not match a stored hash (N from 300-4), a method 300 can proceed as if a fresh connection was indicated (i.e., go to 300-2).

In this way, a method can enable a wireless device to establish a connection to a TLS host without having to decrypt a host certificate by using a previously decrypted host certificate value stored by the wireless device.

Figure 4A:
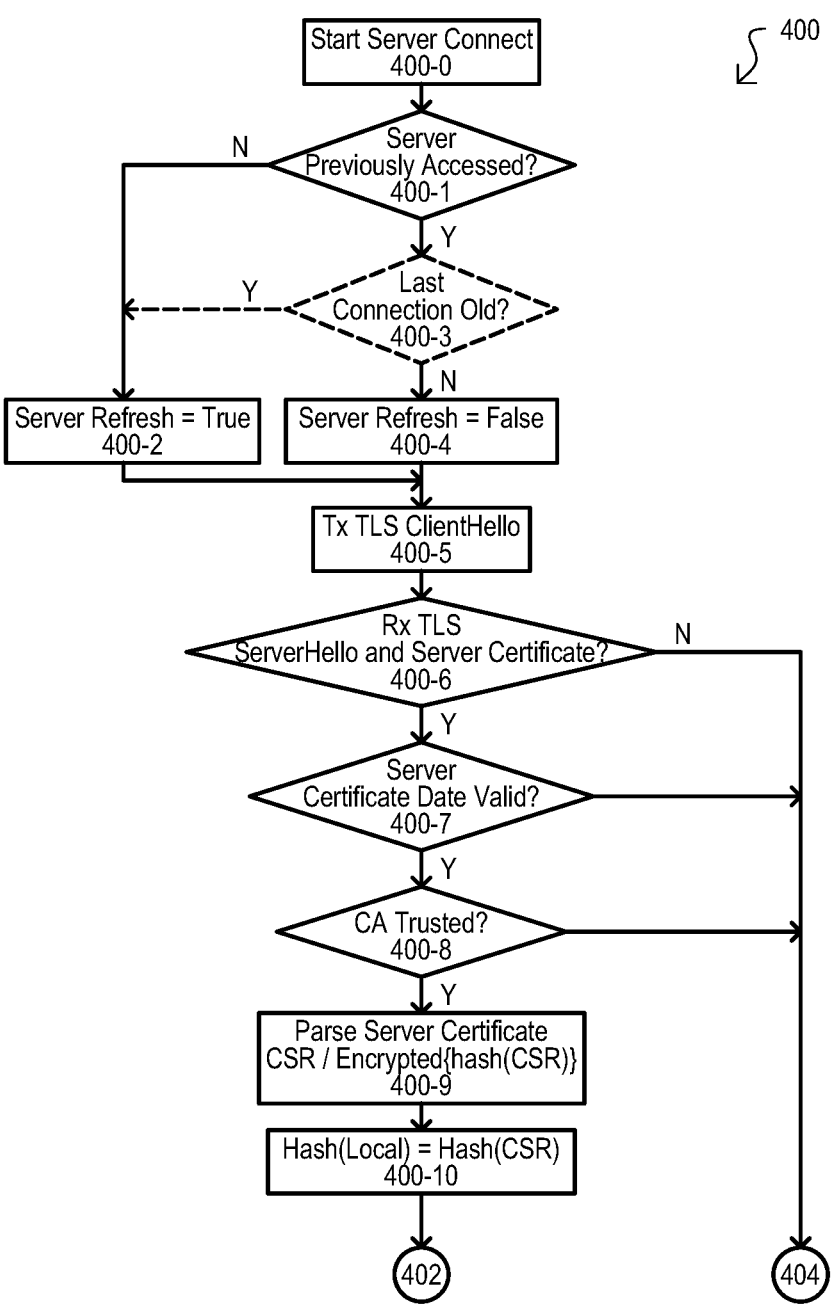
FIGS. 4A and 4B show a flow diagram of a method for executing TLS handshakes according to another embodiment.
Figure 4B:
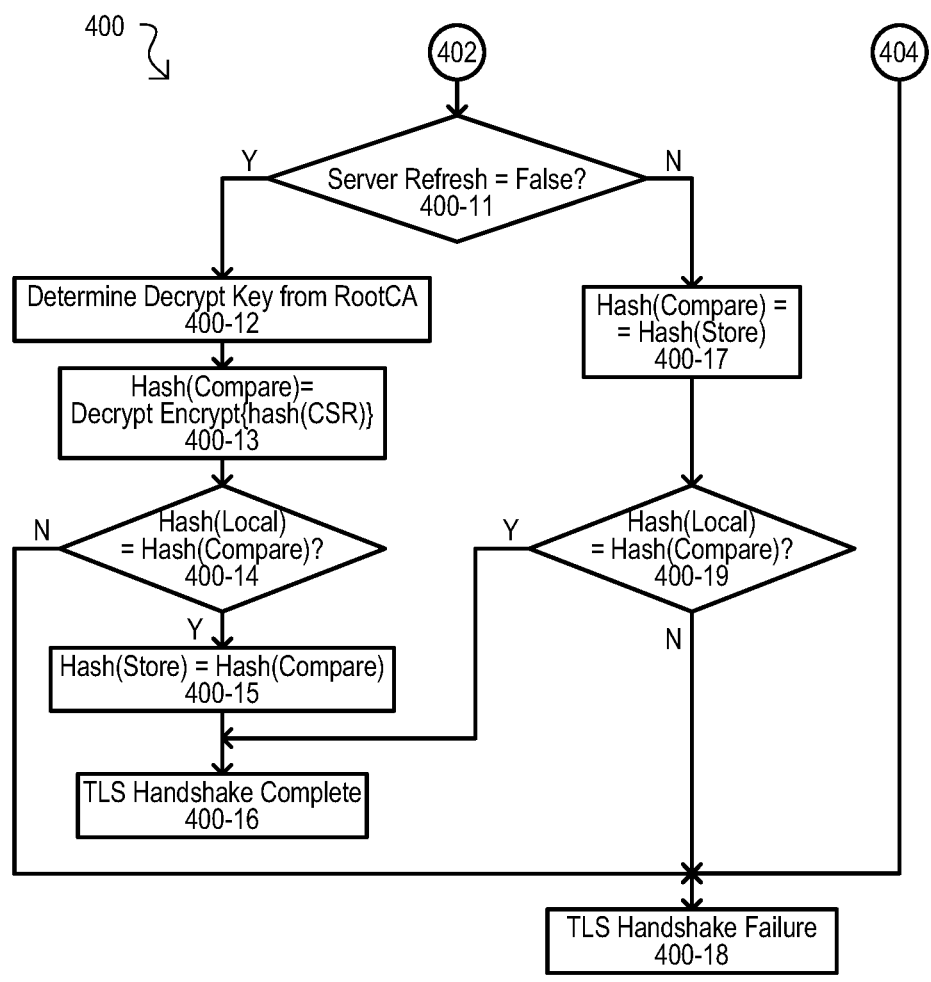

FIGS. 4A and 4B show a flow diagram of a method 400 according to a further embodiment. The flow diagram of FIG. 4A is connected to that of FIG. 4B at the circles 402 and 404. A method 400 can be executed by a wireless device that can execute a TLS handshake with a host device. A method 400 can include starting a server connection 400-0. In some embodiments, such an action can include an application executed by a wireless device requesting secure access to a server the transmission and/or reception of data. A method can determine if a server was previously accessed 400-1. Such an action can include any of those described herein, or equivalents, including accessing historical data for server connections and/or evaluating a received digital certificate.

If a server was not previously accessed (N from 400-1), a server can be designated as needing its security data refreshed 400-2. If a server was previously accessed (Y from 400-1), optionally, a method can determine if a last connection is old 400-3. In some embodiments, such an action can include determining if a predetermined amount of time has passed since a last connection to a server and/or if a wireless device has since changed state (e.g., reset, received updates, moved). If a server was previously accessed (Y from 400-1), a server can be designated as not needing its security data refreshed 400-4.

A method 400 can include a wireless device transmitting a TLS ClientHello message 400-5. Such an action can include transmitting such a message to a destination address corresponding to the server. A method 400 can determine if a TLS ServerHello message and a server certificate is received 400-6. If such a message is not received (N from 400-6), a TLS handshake can be considered to have failed (400-18 in FIG. 4B). If such a message is received (Y from 400-6), a method can determine if a server certificate date is valid 400-7 and if a corresponding CA is trusted 400-8. If either is not determined to be true (N from 400-7 or 400-8), a TLS handshake can be considered to have failed (400-18 in FIG. 4B).

If a server certificate has a valid date and is from a trusted CA (Y from 400-7 and 400-8), a server certificate can be parsed into two or more portions 400-9. In FIG. 4A such portions are shown as "CSR" and "Encrypted{hash(CSR)}". In some embodiments, CSR can be a Certificate Signing Request and "Encrypted{hash(CSR)}" can be generated by taking a hash of the value CSR and then encrypting it with a private key. Value Hash(Local) can be generated by executing the same hash operation of 400-9 on the received CSR portion of the server certificate 400-10.

Referring to FIG. 4B, a method 400 can further include validating the server certificate in different ways depending upon whether server security data has been determined to need a refresh 400-11. If a refresh is indicated (Y from 400-11), a method can determine a decryption key from a device certificate 400-12. In the embodiment shown, a device certificate can be a root CA certificate. A compare value Hash(Compare) can be generated by decrypting a portion of the server certificate (Encrypted{hash(CSR)}) with the decryption key 400-13. A value Hash(Local) (generated by hashing) can be compared to a value Hash(Compare) (generated by decryption) 400-14. If such values do not match (N from 400-14), a server certificate is not validated, and a TLS handshake can be determined to fail 400-18. If such values do match (Y from 400-14), the value generated by decryption (Hash(Compare)) can be stored (shown as Hash(Store)) 400-15. A server certificate can be considered validated, and a TLS handshake can be completed 400-16.

If a refresh is not indicated (N from 400-11), a method can recall a previously stored decrypted value (Hash(Store)) to be used as a hash compare value (Hash(Compare)) 400-17. A value generated by hashing (Hash(Local)) can be compared to the stored value (Hash(Compare)) 400-19. If such values do not match (N from 400-19), a server certificate is not validated, and a TLS handshake can be determined to fail 400-18. If such values do match (Y from 400-19), a server certificate can be considered validated, and a TLS handshake can be completed 400-16.

In this way, a client device can parse a server certificate received in a TLS handshake. For a server that needs security data refreshed, one portion of a server certificate can be decrypted in an authentication operation and then stored. For a server that does not need security data refreshed, an authentication operation can use the stored decrypted value in lieu of that generated by a decryption operation.

Figure 5:
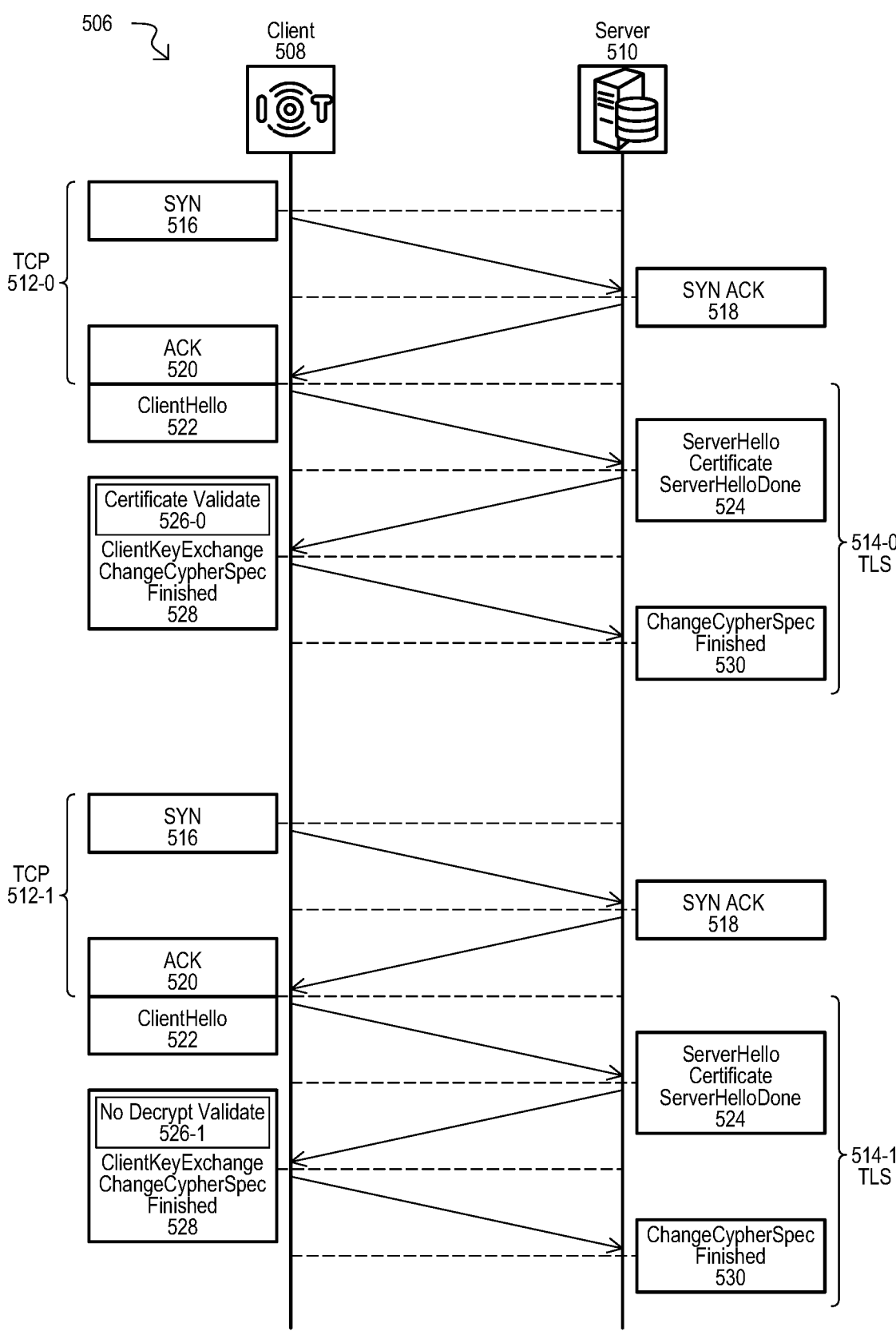
FIG. 5 is a signaling diagram of a client-server system and corresponding operations according to embodiments.

FIG. 5 is a signaling diagram showing a system 506 and operations according to an embodiment. A system 506 can include a client device 508 and a host device 510. In some embodiments, a client device 508 can be a IoT device while a host device 510 can be a server system. FIG. 5 shows a connection operation that includes Transmission Control Protocol (TCP) steps 512-0 followed by corresponding TLS handshake steps 514-0. FIG. 5 also shows a follow-on connection operation that includes TCP steps 512-1 and modified TLS handshake steps 514-1.

TCP steps 512-0 can include a client 508 transmitting a synchronization message (SYN) 516. In response, a host 510 can return a synchronization acknowledgement (SYN ACK) 518. A client 508 can return its own ACK 520, ending the TCP steps 512-0.

TLS handshake steps 514-0 can include a client 508 transmitting a ClientHello message 522. Such a message can include version information, supported cipher suites, and other information. A host 510 can return a ServerHello message, followed by a host certificate, and then a ServerHelloDone message 524.

A client 508 can validate the host certificate 526-0. Such an action can include a decryption operation on part of a host certificate. Further, unlike a conventional TLS handshake, a decrypted result corresponding to a valid host certificate can be stored for use in a possible subsequent TLS handshake (e.g., 514-1).

In the embodiment shown, a client 508 can send a ClientKeyExchange message to enable a host to generate a master encryption key, a ChangeCypherSpec message to indicate further messages will be encrypted with a shared key, and indicate the TLS handshake is finished. A host 510 can return its own ChangeCypherSpec message and indicate/confirm the TLS handshake is finished.

In the embodiment shown, follow-on TCP steps 512-1 can follow those of the prior TCP steps 512-0. Subsequent TLS handshake steps 514-1 can follow those of the prior TLS handshake steps 514-0, except that a upon receiving a host certificate 524, a client 508 can validate such a certificate without executing the decryption operation of the previous certificate validation operation (i.e., 526-0). Instead of decrypting a portion of a received host certificate, a client can use a previously stored decryption result.

In this way, a client that establishes a secure connection with a TLS handshake can save a decryption result used to validate a host certificate for use in subsequent TLS connections, to avoid having to execute the same decryption operation.

To better understand various features of the disclosed embodiments, the generation of a digital certificate will be described with reference to FIG. 6. FIG. 6 shows the generation of a digital certificate 632 that includes data 632-0. Data 632-0 can take any suitable form according to the certificate standard used. A hash function 632-1 can be executed on the data 632-0 to generate a hash value 632-2. A hash value 632-2 can be encrypted to generate a signature value 632-4. Such an encryption 632-3 can use a private encryption key with a corresponding public decryption key provided to other devices. A signature value 632-4 can be attached to data 632-0 to create digitally signed data 634, which can be included in a digital certificate.

Figure 7A:
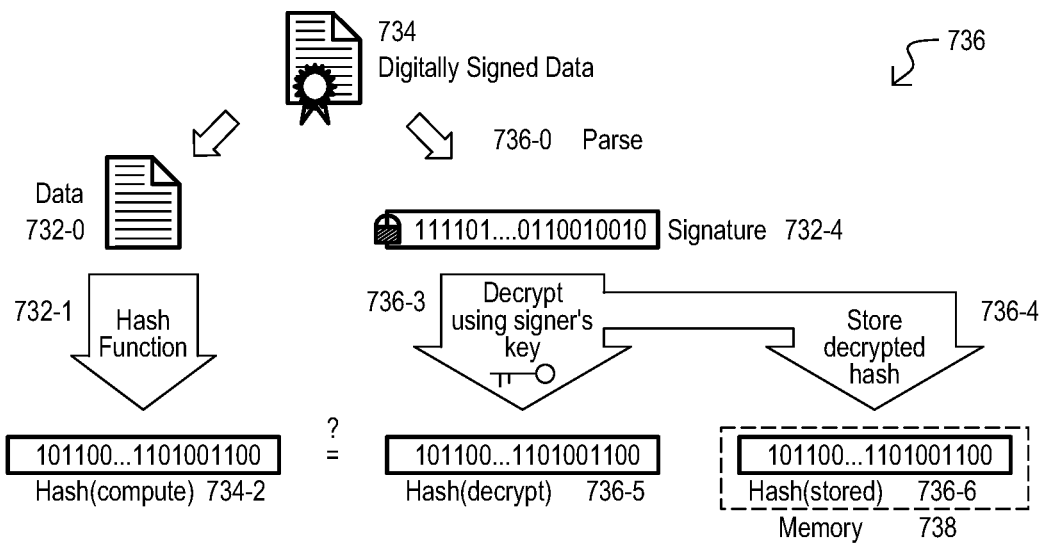
FIGS. 7A and 7B are diagrams showing authentication methods for digitally signed data according to an embodiment.
Figure 7B:
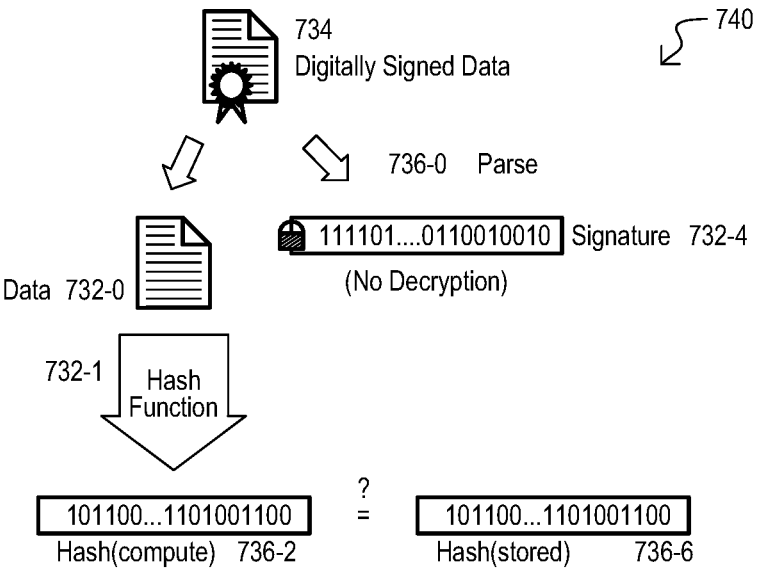

FIGS. 7A and 7B show validation operations for digitally signed data, like that generated in FIG. 6. FIG. 7A shows a validation operation 736 that can store a decrypted value for use in subsequent validation operations to avoid having to repeat a decryption operation. A validation operation 736 can start with digitally signed data 734, which can be generated as shown in FIG. 6. Digitally signed data 734 can be parsed 736-0 into a data portion 732-0 and a digital signature portion 732-4.

A hash operation 732-1 can be executed on a data portion 732-0. Such a hash function can be the same as that used to generate a digital signature (e.g., 632-1 in FIG. 6). The result can be a computed hash value 734-2. A digital signature 732-4 can be subject to a decryption operation 736-3 with a public decryption key corresponding to the private encryption key (e.g., that used in 632-3 of FIG. 6). A resulting value can be a decrypted hash value 736-5. If a decrypted hash value 736-5 matches the computed hash value 734-2, the decrypted hash value 736-5 can be saved in memory circuits 738 as a stored hash value 736-3.

FIG. 7B shows a validation operation 740 that can use a stored decrypted value from a previous validation operation to validate digitally signed data. A validation operation 740 can start with digitally signed data 734, which can be generated as shown in FIG. 6. Digitally signed data 734 can be parsed 736-0 to access a data portion 732-0. As in the case of FIG. 7A, a hash operation 732-1 can be executed on the data portion 732-0 to generate a computed hash value 736-2. However, the computed hash value 736-2 can be compared to a stored hash value 736-6, which can have been previously generated and stored as shown in FIG. 7A.

In this way, digitally signed data can be parsed and decrypted, and if validated, saved. Such saved decrypted data can be used to validate digitally signed data in a subsequent validation operation.

Figure 8:
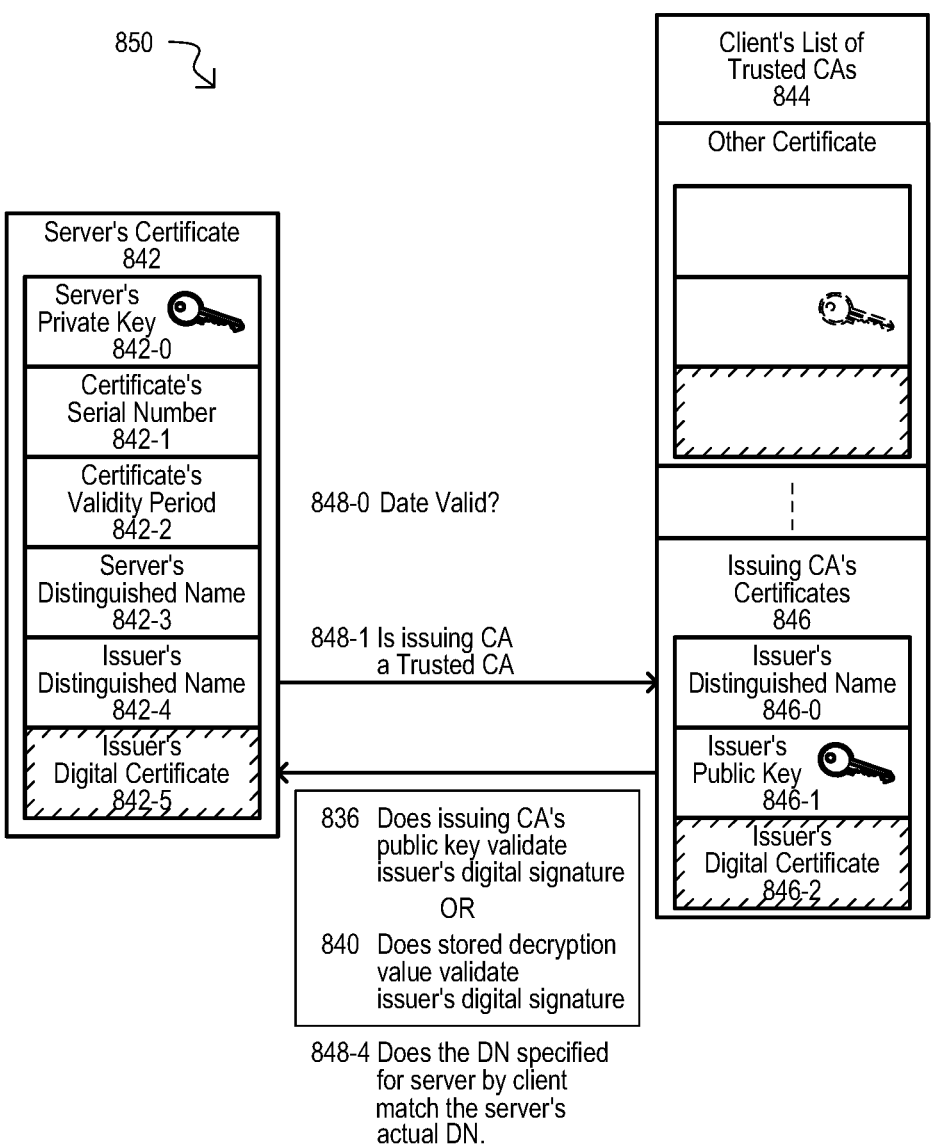
FIG. 8 is a diagram showing operations on digital certificates according to an embodiment.

FIG. 8 is a diagram showing operations performed with digital certificates 850 according to an embodiment. FIG. 8 shows a server (e.g., host) certificate 842, a client (e.g., wireless device) list of trusted CAs 844, and corresponding operations 848-0, 848-1, 836, 840 and to 848-4. A server certificate 842 can include a server private key 842-0, serial number 842-1, validity period 842-2, server distinguished name (DN) 842-3, issuer DN 842-4 and issuer digital certificate 842-5. A client list of trusted CAs 844 can include digital certificates from various CA, including an issuer digital certificate 846 corresponding to that of the server certificate (i.e., 842-5).

Validation operations 850 can include a client comparing a certificate validity period 842-2 to a current time/date 848-0 to determine if the server certificate is current or expired. If the validity period has expired, a validation operation can fail. An issuer's DN 842-4 can be compared 848-1 to an issuer's name in a client's issuer digital certificate 846. If such DNs do not match, a validation operation can fail.

Validation operations 850 can further include cryptographic related validation of a server certificate. A client can determine if an issuing CAs public key 846-1 validates an issuer's digital signature of a server certificate 836. Such an operation can include decrypting a portion of a server certificate with a public key 848-1. However, such an operation can also include using a stored, previous decryption result in such a validation 840. If either cryptographic related validation fails, an authentication operation can fail.

Validation operations 850 can also include determining if a DN for a server in a client certificate matches that of the server certificate. If such DNs do not match, a validation operation can fail.

In this way, a client can validate a server certificate with decryption operations using a public key from its own CA issued digital certificate. Results from such decryption operations can be used to validate the same server in subsequent validation operations instead of repeating such a decryption with the public key.

Figure 9:
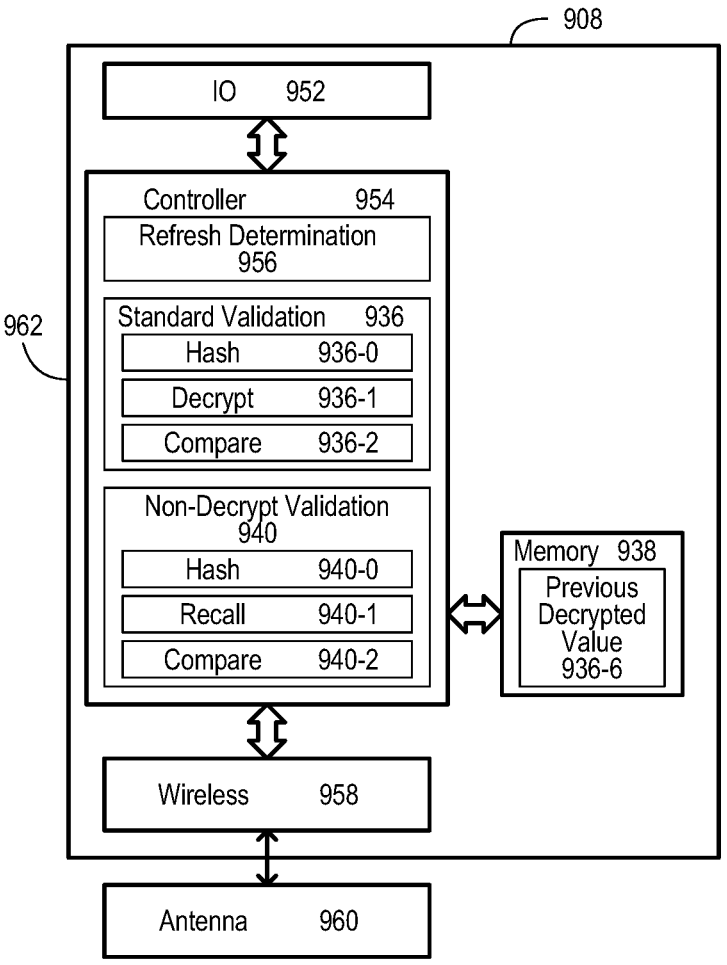
FIG. 9 is a block diagram of a wireless device according to an embodiment.

FIG. 9 is a block diagram of a wireless device 908 according to an embodiment. In some embodiments, a wireless device 908 can be a client or part of a client that establishes secure wireless connections to an endpoint that provides a digital certificate for authentication. A device 908 can include input/output (IO) circuits 952, a controller circuit 954, memory circuits 938 and wireless circuits 958. IO circuits 944 can enable a device 908 to communicate with other systems and/or a user, and can include any suitable circuits, including wired and/or wireless circuits.

Controller circuit 954 can include any suitable circuits for executing wireless communications as described herein, and equivalents, including but not limited to one or more processors, custom logic circuits, programmable logic circuits and/or machine learned/learning systems. Controller circuits 954 can include refresh determination operations 956, decryption validation operations 936, and non-decryption validation operations 940. Refresh determination operations 956 can include any of those described herein, or equivalents, including those based on device operations (e.g., history of connections, operating state) and/or information in a certificate received from a connection destination.

Decryption validation operations 936 can include, but are not limited to, a hash operation 936-0 which can be executed on one portion of a received authentication value, a decryption operation 936-1 which can be executed on another portion of a received authentication value, and a compare operation 936-2 which can compare a hash result to a decrypted result to validate the authentication value. In some embodiments, compare operations 936-2 can also store a decrypted value from operation 936-1 in memory 938.

Non-decryption operations 940 can include, but are not limited to, a hash operation 940-0 like 936-0, a recall operation 936-1 that can access memory circuits 938 to acquire a previous decrypted value 936-6, and a compare operation 940-2 which can compare a hash result to the recalled decrypted result to validate the authentication value.

Memory circuits 938 can include any suitable memory circuits, including but not limited to nonvolatile memory, volatile memory, and combinations thereof. Memory circuits 938 can store previously decrypted values 936-6 generated by operations 936-1.

Wireless circuits 958 can include circuits compatible with one or more standards, including public and/or private standards. In some embodiments, radio circuits 958 can be compatible with one or more IEEE 802.11 802.11 wireless (Wi-Fi) or related standards. Wireless circuits 958 can be connected to an antenna system 960.

In some embodiments, IO circuits 952, controller circuits 954, memory circuits 938 and wireless circuits 958 can be part of a same integrated circuit substrate 962.

In this way, a wireless device can include circuits for validating authentication values with a decryption operation, and for validating authentication values with decryption values saved in memory circuits from previous decryption operations.

Figures 10, 11:
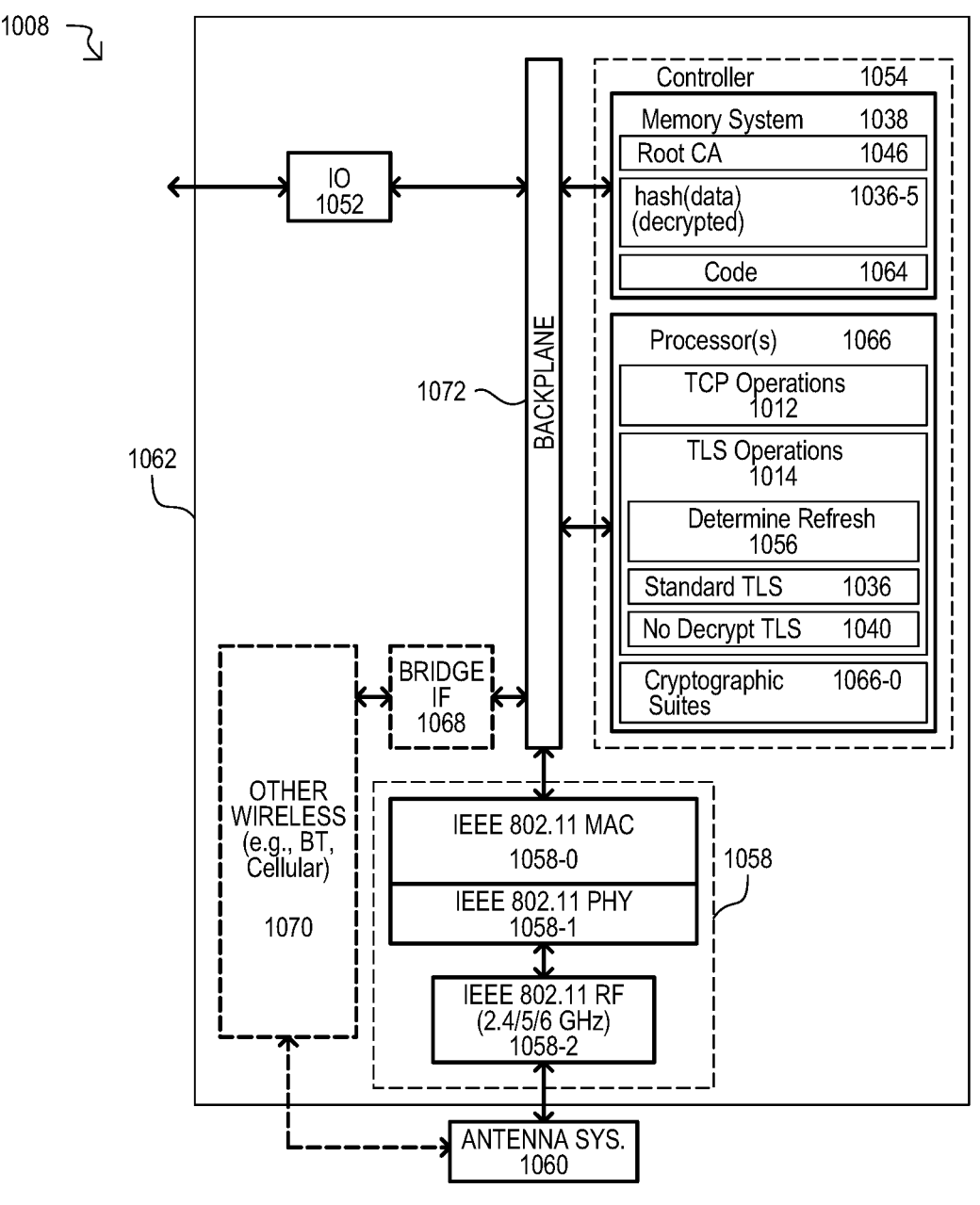
FIG. 10 is a block schematic diagram of a wireless device according to another embodiment.
FIG. 11 is a diagram of an integrated circuit device according to an embodiment.

FIG. 10 shows a device 1008 according to another embodiment. In some embodiments, a device 1008 can be client or part of a client device that can establish a TCP secure connection with a server system using a TLS handshake. A device 1008 can include a controller section 1054, Wi-Fi circuits 1058, and optionally, other wireless circuits 1070 and bridge circuits 1068 connected to one another over a backplane/bus 1072.

A controller section 1054 can include memory circuits 1038 and processor circuits 1066. Memory circuits 1038 can include any suitable memory circuits, including secure nonvolatile memory, and optionally, volatile memory. Memory circuits 1038 can store data for enabling the various operations of wireless device 1008, including a device digital certificate 1046, a decryption result 1036-5 and code 1064. A device digital certificate 1046 can be provided by a trusted CA, and in the embodiment shown can be a Root CA. A device digital certificate 1046 can be loaded onto a device 1008 by a manufacturer and stored in a secure memory. A device digital certificate 1046 can include a public decryption key for decryption operations on received server certificates. A decryption result 1036-5 can be a value generated in a previous authentication operation that validated a server certificate. In the embodiment shown, a decryption result 1036-5 can be a hash value resulting from decrypting a portion of a received server certificate. Code 1064 can be code (e.g., firmware) executable by processor section 1066 to provide the various processor operations described herein.

Processor circuits 1066 can execute code 1064 stored in memory circuits 1038 to provide various functions for the device 1008. Operations provided by processor circuits 1066 can include, but are not limited to, TCP operations 1012, TLS operations 1014 and one or more cryptographic suites 1066-0. TCP operations 1012 can include TCP steps according to any suitable standard, including but not limited to those shown as 512-0/1 in FIG. 5. TLS operations 1014 can include determining if refresh of server data is indicated 1056, a standard TLS handshake 1036 and a no decryption TLS handshake 1040. Determining refresh 1056 can include operations such as any of those described herein, or equivalents, and can determine if a standard TLS handshake 1036 or no decrypt TLS handshake 1040 is performed. A standard TLS handshake 1036 can execute a decryption operation on a portion of a received server certificate using a public key included in device certificate 1046. In some embodiments, a standard TLS handshake 1036 can take the form of that shown in as 514-0 in FIG. 5. A no decrypt TLS handshake 1040 can execute a decryption operation using stored decryption result 1036-5 in lieu of a decryption operation. In some embodiments, a no decrypt TLS handshake 1040 can take the form of that shown in as 514-1 in FIG. 5

Cryptographic suites 1066-0 of processor circuits 1066 can include one or more cryptographic suites for providing the various hash functions and decryption functions needed for the described authentication operations. Further, such cryptographic suites can be used for full encryptions with an agreed upon master key following successful completion of a TLS handshake.

Wi-Fi circuits 1058 can provide wireless communications compatible with one or more Wi-Fi standards. Wi-Fi circuits 1058 can include MAC layer circuits 1058-0, physical layer (PHY) circuits 1058-1, and RF circuits 1058-2. Such circuits (1058-0, -1, -2) can be compatible with one or more Wi-Fi standards, on any suitable band, including but not limited to the 2.4 GHz, 5 GHz and/or 6 GHz bands.

IO circuits 1052 can input or output signals that can enable control of a device 1008 from sources external to the device according to any suitable fashion. In some embodiments, IO circuits 1044 can include serial communication circuits, including but not limited to interfaces compatible with a serial digital interface (SDI), universal serial bus (USB), universal asynchronous receiver transmitter (UART), I2C, or I2S.

Bridge interface circuits 1068 can enable communications between Wi-Fi circuits 1058 and other wireless circuits 1070. In some embodiments, such communications can control which wireless circuits (1058 or 1070) control a shared medium (e.g., 2.4 GHz band).

Other wireless circuits 1070 can be one or more wireless circuits compatible with standard other than a Wi-Fi standard, including but not limited to, one or more BT standards, one or more IEEE 802.15.4 or related standards and/or one or more cellular network standards.

A device 1008 can operate in conjunction with an antenna system 1060 having one or more antennas compatible with one or more Wi-Fi standards, as well as other standards if another wireless section 1070 is included.

In some embodiments, IO circuits 1052, controller section 1054, and Wi-Fi circuits 1058 can be formed with a same integrated circuit substrate 1062.

In this way, a Wi-Fi compatible wireless device can execute TCP and corresponding TLS handshake steps, where a TLS handshake may or may not include decryption of a received digital certificate, depending upon whether the corresponding connection is deemed to need a refresh in security data.

While embodiments can include systems and devices with various interconnected components, embodiments can also include unitary devices having the ability to provide authentication operations that can leverage a previous decryption result to avoid having to repeat a decryption operation when establishing a connection to a previously accessed endpoint. FIG. 11 show one example of a packaged single chip wireless device 1108 according to an embodiment. Such a device 1108 can include circuits for executing authentication validation operations as described herein and equivalents. In some embodiments, a device 1108 can include circuits like those shown in either of FIG. 9 or 10.

However, it is understood that a device according to embodiments can include any other suitable integrated circuit packaging type, as well as direct bonding of a device chip onto a circuit board or substrate.

In this way, a wireless device that can switch to a faster and/or lower power non-decrypting authentication operation can be included in a single integrated circuit device.

Figure 12:
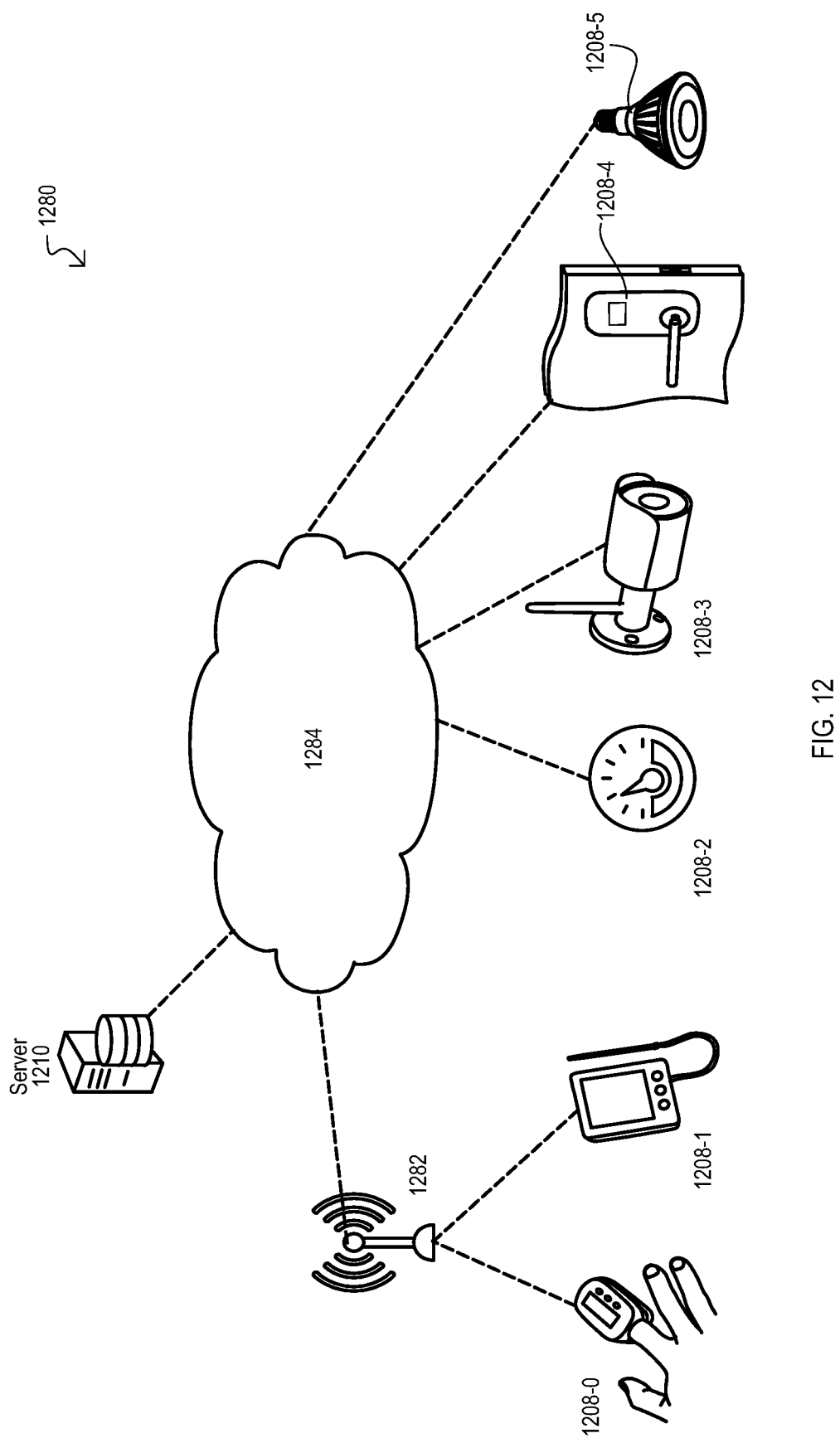
FIG. 12 is a diagram showing a system with Internet-of-Things (IoT) devices according to an embodiment.

FIG. 12 shows a system 1280 according to another embodiment. A system 1280 can include wireless devices 1208-0 to 1208-5 which can communicate with a server system 1210 over a network system 1284. Wireless devices (1208-0 to -5) can include devices as described herein and/or circuits for executing the various methods described herein.

In some embodiments, wireless devices (1208-0 to -5) can be IoT type devices, including but not limited to, medical devices 1208-0/1, instrumentation devices 1208-2, security devices 1204-3/4 or lighting devices 1204-5. However, such wireless devices are provided by way of example, and any suitable wireless device can benefit from faster and/or lower power reconnection operations as described herein or equivalents. Devices (1208-0 to -5) can connect to a network system 1284 in any suitable manner, including through an access point device 1282. However, devices are not limited to Wi-Fi networks for connection to a server 1210, as any suitable protocol/method that utilizes decryption in a validation operation is anticipated by the embodiments described herein.

Along these same lines, a network system 1284 can include various interconnected networks, including piconets, PANs, LANs, WANs, both private and public, as well as the Internet. In operation, devices (1208-0 to -5) can make initial connections to a server 1210, in which a received authentication value can be validated with a decryption operation. Result(s) from such decryption operations can be saved, and then used in subsequent connections to a server 1210 in lieu of decryption operations.

In this way, IoT type devices can make more rapid and/or lower power consumption connections to servers by utilizing saved decryption results in place of repeating a same decryption operation.

Figure 13A:
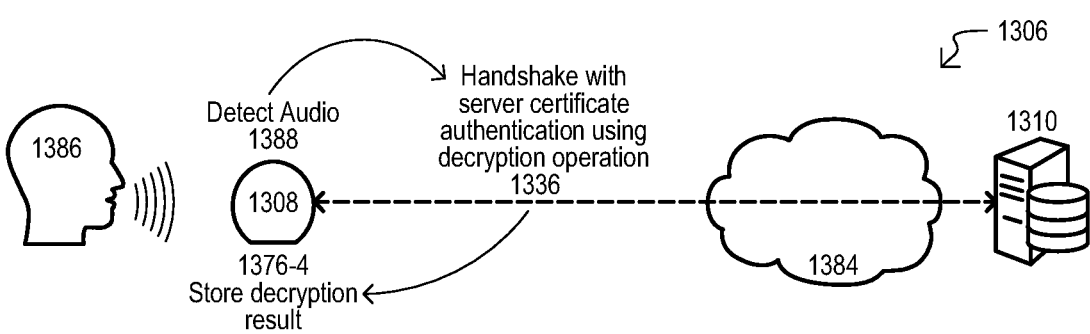
FIGS. 13A and 13B are diagrams showing authentication operations of a voice activated/processing system according to an embodiment.
Figure 13B:

While systems according to embodiments can take any suitable form, FIGS. 13A and 13B are diagrams showing operations of a voice activated/processing system 1306 according to an embodiment. In such systems, it can be desirable to respond to a voice input and/or provide voice data for processing as soon as is possible. A system 1306 can include a wireless device 1308 in communication with a server system 1310 over a network system 1384.

Referring to FIG. 13A, a wireless device 1308 can respond to audio inputs, such as verbal requests from a user 1386. In some embodiments, upon detecting an audio input 1388, such data can be captured, and a connection made with server system 1310 for processing of the audio data. Such a connection can include a handshake in which wireless device 1308 receives and validates a server certificate before establishing an encryption key and sending the voice data. Validation of such a certificate can include decrypting a portion of the server certificate 1336 as described herein or equivalents. Such a decryption result can be stored 1376-4 for use in subsequent connections to server.

Referring to FIG. 13B, a wireless device 1308 can respond to audio inputs as described for FIG. 13A. However, validation of a server certificate can include using a stored decryption result 1340 for a faster handshake with server system 1310.

In this way, voice responsive systems that establish secure connections can provide faster response by utilizing a stored decryption result in place of a repeated decryption operation.

Figure 14:
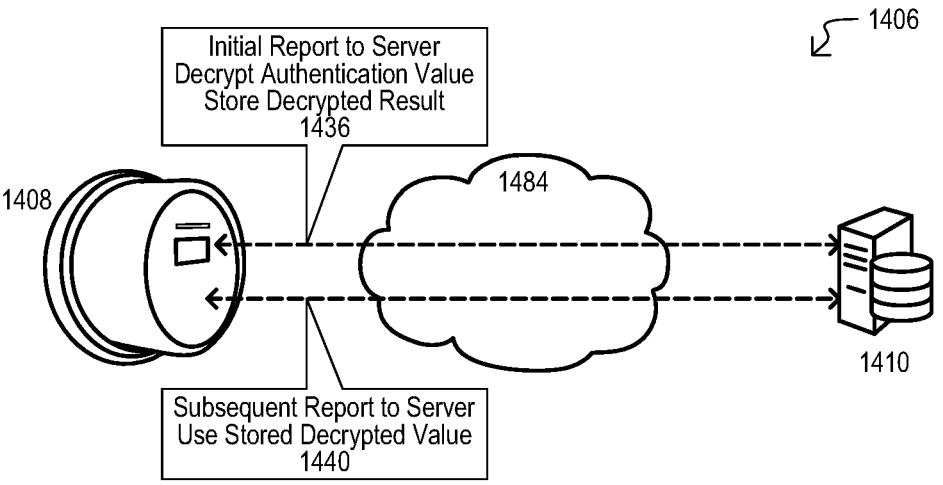
FIG. 14 is a diagram showing authentication operations of a metering system according to an embodiment.

FIG. 14 is a diagram according to a further embodiment. A system 1406 can include a wireless metering device 1408 that can periodically connect to a server system 1410 over a wireless network system 1484. In a such a system 1406, metering device 1408 will rarely, if ever, connect to another endpoint other than server system 1410. Further, execution of decryption operations can require more computing resources than a hashing operation, and thus consume more power.

In an initial connection to a server system, a wireless metering device 1408 can decrypt an authentication value and store the decrypted result 1436. In a subsequent connection, a wireless metering device 1408 can use a stored decryption result in place of a decryption operation to authenticate server 1410. Such an action can consume less power than an initial connection 1436.

In this way, a wireless device can save a decryption result generated by establishing one wireless connection for use in a subsequent wireless connection to the same endpoint, thus avoiding repetitive use or circuits that consume more power.

Embodiments can include methods, devices and systems that include, by operation of a first wireless device, executing a hash operation on a first portion of a received authentication value to generate a hash result. In response to determining that a connection is to be refreshed, an authentication value can be validated by decrypting a second portion of the authentication value to generate a decryption result and comparing the hash result to the decryption result. The decryption result can be stored. In response to determining that a connection is not to be refreshed, an authentication value can be validated by comparing the hash result to a previously stored decryption result.

Embodiments can include methods, devices and systems having wireless circuits configured to transmit and receive wireless messages, including receiving an authentication value. Controller circuits can be configured to execute a hash operation on a first portion of the authentication value to generate a hash result. In response to determining that a connection is to be refreshed, an authentication value can be validated by decrypting a second portion of the authentication value to generate a decryption result and comparing the hash result to the decryption result. The decryption result can be stored. In response to determining that a connection is not to be refreshed, an authentication value can be validated by comparing the hash result to a previously stored decryption result. Memory circuits can be configured to store at least a previously generated decryption result.

Embodiments can include methods, devices and systems having a wireless device configured to execute a hash operation on a first portion of a received authentication value to generate a hash result. In response to determining that a connection is to be refreshed, an authentication value can be validated by decrypting a second portion of the authentication value to generate a decryption result and comparing the hash result to the decryption result. A decryption result can be stored. In response to determining that the connection is not to be refreshed, an authentication value can be validated by comparing the hash result to a stored previous decryption result. An antenna system can be coupled to the wireless device.

Methods, devices and systems according to embodiments can include a received authentication value comprising a server digital certificate.

Methods, devices and systems according to embodiments can include accessing a decryption key included in a digital certificate stored by the wireless device to decrypt a second portion of the authentication value.

Methods, devices and systems according to embodiments can include an authentication value being included in a message of a TLS handshake.

Methods, devices and systems according to embodiments can include completing the TLS handshake in response to at least validating the authentication value according to the methods, devices and systems described herein.

Methods, devices and systems according to embodiments can include determining if a connection is to be refreshed by determining if the authentication value corresponds to a previous wireless connection.

Methods, devices and systems according to embodiments can include determining if a connection is to be refreshed by determining if the authentication value corresponds to a previous wireless connection that was made within a pre-determined time period.

Methods, devices and systems according to embodiments can include an authentication value being received in at least one data frame compatible with at least one IEEE 802.11 wireless standard.

Methods, devices and systems according to embodiments can include storing a decryption key in memory circuits of a wireless device, and decrypting a second portion of an authentication value with the decryption key.

Methods, devices and systems according to embodiments can include wireless circuits that are compatible with at least one IEEE 802.11 wireless standard.

Methods, devices and systems according to embodiments can include an authentication value being a host device certificate. Memory circuits can be configured to store a client device certificate that includes a decryption key. Controller circuits can be configured to decrypt a second portion of an authentication value with the decryption key.

Methods, devices and systems according to embodiments can include a device certificate can be a root certificate from a certificate authority. A decryption key can be a public key of a public key infrastructure.

Methods, devices and systems according to embodiments can include an authentication value being included in a message of a TLS handshake.

Methods, devices and systems according to embodiments can include controller circuits being configured to determine if an authentication value corresponds to a previous wireless connection.

Methods, devices and systems according to embodiments can a wireless device configured to wirelessly transmit a first message. A remote device can be configured to transmit at least a second message in response to the first message that includes an authentication value.

Methods, devices and systems according to embodiments can include first and second messages being part of a TLS handshake.

Methods, devices and systems according to embodiments can include a wireless device configured to complete a TLS handshake in response to at least validating an authentication value.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   by operation of a wireless device,
      executing a hash operation on a first portion of a received authentication value to generate a hash result,
      in response to determining that a connection is to be refreshed, the determining that the connection is to be refreshed comprising determining if the authentication value corresponds to a previous wireless connection made within a predetermined time period, validate the authentication value by
         decrypting a second portion of the authentication value to generate a decryption result,
         comparing the hash result to the decryption result, and
         storing the decryption result, and
      in response to determining that the connection is not to be refreshed, validate the authentication value by comparing the hash result to a previously stored decryption result.

2. The method of claim 1, wherein the received authentication value comprises a server digital certificate.

3. The method of claim 1, wherein decrypting the second portion of the authentication value includes accessing a decryption key included in a local digital certificate stored by the wireless device.

4. The method of claim 1, wherein the authentication value is included in a message of a transport layer security (TLS) handshake.

5. The method of claim 4, further including completing the TLS handshake in response to at least validating the authentication value.

6. The method of claim 1, wherein the authentication value is received in at least one data frame compatible with at least one IEEE 802.11 wireless standard.

7. The method of claim 1, further including:
   storing a decryption key in memory circuits of the wireless device; and decrypting the second portion with the decryption key.

8. A device, comprising:

wireless circuits configured to transmit and receive wireless messages, including receiving an authentication value;

controller circuits configured to execute a hash operation on a first portion of the authentication value to generate a hash result, in response to determining that a connection is to be refreshed, the determining that the connection is to be refreshed comprising determining if the authentication value corresponds to a previous wireless connection made within a predetermined time period, validate the authentication value by decrypting a second portion of the authentication value to generate a decryption result and comparing the hash result to the decryption result, store the decryption result, and in response to determining that the connection is not to be refreshed, validate the authentication value by comparing the hash result to a previously stored decryption result; and memory circuits configured to store at least the previously stored decryption result.

9. The device of claim 8, wherein the wireless circuits are compatible with at least one IEEE 802.11 wireless standard.

10. The device of claim 8, wherein:

the authentication value comprises a host device certificate;

the memory circuits are configured to store a client device certificate that includes a decryption key; and the controller circuits are configured to decrypt the second portion of the authentication value with the decryption key.

11. The device of claim 10, wherein:

the device certificate comprises a root certificate from a certificate authority; and the decryption key comprises a public key of a public key infrastructure.

12. The device of claim 8, wherein the authentication value is included in a message of a transport layer security handshake.

13. The device of claim 8, wherein the controller circuits are further configured to determine if the authentication value corresponds to a previous wireless connection.

14. A system, comprising:

a wireless device configured to execute a hash operation on a first portion of a received authentication value to generate a hash result, in response to determining that a connection is to be refreshed, the determining that the connection is to be refreshed comprising determining if the authentication value corresponds to a previous wireless connection made within a predetermined time period, validate the authentication value by decrypting a second portion of the authentication value to generate a decryption result and comparing the hash result to the decryption result, store the decryption result, and in response to determining that the connection is not to be refreshed, validate the authentication value by comparing the hash result to a stored previous decryption result; and an antenna system coupled to the wireless device.

15. The system of claim 14, wherein the wireless device is configured to determine if the authentication value corresponds to a previous wireless connection.

16. The system of claim 14, further including:

the wireless device is further configured to wirelessly transmit a first message; and a remote device configured to transmit at least a second message in response to the first message that includes the authentication value.

17. The system of claim 16, wherein the first and second messages are part of a transport layer security (TLS) handshake.

18. The system of claim 17, further including the wireless device is configured to complete the TLS handshake in response to at least validating the authentication value.

* * * * *